(12) United States Patent
Cromer et al.

(10) Patent No.: US 6,567,920 B1
(45) Date of Patent: May 20, 2003

(54) DATA PROCESSING SYSTEM AND METHOD FOR AUTHENTICATION OF DEVICES EXTERNAL TO A SECURE NETWORK UTILIZING CLIENT IDENTIFIER

(75) Inventors: Daryl Carvis Cromer, Cary, NC (US); Dhruv M. Desai, Cary, NC (US); Brandon Jon Ellison, Raleigh, NC (US); Eric Richard Kern, Durham, NC (US); Howard Locker, Cary, NC (US); Andy Lloyd Trotter, Raleigh, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,892

(22) Filed: Mar. 31, 1999

(51) Int. Cl.[7] ................................................ G06F 11/30
(52) U.S. Cl. ........................................ 713/201; 713/176
(58) Field of Search ................................ 713/201, 200, 713/202, 155, 176, 191, 150; 705/56

(56) References Cited

U.S. PATENT DOCUMENTS 6,353,886 B1 * 3/2002 Howard et al. ............. 713/156
6,442,696 B1 * 8/2002 Wray et al. ................. 713/201
2001/0014945 A1 * 8/2001 Muschenborn ............. 713/201

* cited by examiner

Primary Examiner—Norman M. Wright
(74) Attorney, Agent, or Firm—Carlos Munoz-Bustamante; Bracewell & Patterson, LLP

(57) ABSTRACT

A data processing system and method are disclosed for authenticating a client computer system to a secure network prior to permitting the client computer system to attempt to log-on to the network. The secure network is controlled by a server computer system. A unique identifier is established which identifies the client computer system. The unique identifier is encrypted. Prior to permitting the client computer system to attempt to log-on to the secure network, the client computer system transmits the encrypted identifier to the server computer system. Also prior to permitting the client computer system to attempt to log-on to the network, the server computer system utilizes the unique identifier to determine whether to permit the client computer system to attempt to log-on to the network. The client computer system is authenticated prior to permitting the client computer system to attempt to log-on to the network.

13 Claims, 5 Drawing Sheets

DATA PROCESSING SYSTEM AND METHOD FOR AUTHENTICATION OF DEVICES EXTERNAL TO A SECURE NETWORK UTILIZING CLIENT IDENTIFIER

BACKGROUND OF THE INVENTION

1. Field of the Invention

The present invention relates in general to data processing systems and, in particular, to a data processing system and method for authenticating a client computer system to a secure network prior to permitting the client to attempt to log-on to the network. Still more particularly, the present invention relates to a data processing system and method for authenticating a client computer system utilizing an encrypted client identifier to a secure network prior to permitting the client to attempt to log-on to the network.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

A business may establish a secure network. The secure network provides for secure transmission of data. All computer systems included inside the secure network may freely attempt to log-on to the network. Access to the secure network is provided only within company buildings, or transmission between buildings over dedicated or leased lines.

The secure network may be protected by a firewall. The firewall provides an access point to external systems to the network. Computer systems included inside the firewall have access to the secure network and may view network traffic. Computer systems outside the firewall do not have direct access to the network. Access to the network by external computer systems is controlled by the firewall.

A mobile computer user may need to access the secure network remotely. In order to access the network through the firewall, the remote user needs to establish a communication link with the server, such as through a telephone line, and then attempt to log-on utilizing the user's name and password. This creates a security risk for the network, however. The firewall will provide a communication link for any user attempting to log-on to the network. All the user needs to remotely dial into the network to attempt to log-on to the network is a telephone number and access and server numbers.

Encryption algorithms are known to ensure that only the intended recipient of a message can read and access the message. One known encryption algorithm is an asymmetric, or public key, algorithm. The public key algorithm is a method for encrypting messages sent from a first computer system to a second computer system. This algorithm provides for a key pair including a public key and a private key for each participant in a secure communication. This key pair is unique to each participant. Examples of such an encryption scheme are an RSA key pair system, and a secure sockets layer (SSL) system.

Therefore a need exists for a data processing system and method for authenticating a client computer system to a secure network prior to permitting the client to attempt to log-on to the network.

SUMMARY OF THE INVENTION

A data processing system and method are disclosed for authenticating a client computer system to a secure network prior to permitting the client computer system to attempt to log-on to the network. The secure network is controlled by a server computer system. A unique identifier is established which identifies the client computer system. The unique identifier is encrypted. Prior to permitting the client computer system to attempt to log-on to the secure network, the client computer system transmits the encrypted identifier to the server computer system. Also prior to permitting the client computer system to attempt to log-on to the network, the server computer system utilizes the unique identifier to determine whether to permit the client computer system to attempt to log-on to the network. The client computer system is authenticated prior to permitting the client computer system to attempt to log-on to the network.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention is a method and system for authenticating a client computer system to a secure network prior to permitting the client to attempt to log-on to the network. A server computer system is included which controls the network. The network is secured by a firewall which protects the network by limiting access to it.

A communication link is established between two devices when the devices are coupled together in some manner and the devices are able to transmit data to each other. Once a communication link is established between a server and a client, the client may attempt to log-on to the server's network. If the client successfully logs-on to the network, an application link is established between the client and the network. Only when an application link is established can the client access the network and its resources.

In the present invention, in response to a communication link being established between the client and the server, the client attempts to authenticate itself to the network. If it is successful, the client may attempt to log-on to the server and establish an application link. However, if the authentication is unsuccessful, the client is prohibited from attempting to log-on to the network by the server refusing to accept any further commands from this client.

Each client is associated with a unique client identifier which identifies the particular client. The unique client identifier allows for securely distinguishing one client from another. When an external client needs to log-on to the secure network, hardware included within the external client first encrypts the client's unique identifier. The hardware then transmits the encrypted client identifier to the server. If the server determines that the particular client is permitted to attempt to log-on to the network, the server transmits an approval to the external client. The external client may then attempt to log-on by transmitting a user name and password. If the user name and password are approved, the external client may then access the network and the network's resources. In this manner, external clients must be approved prior to attempting to log-on to the network. Unapproved external clients may not attempt to log-on to the network.

The unique identifier is stored in protected storage within the client. The protected storage is one-time-writable storage. The ability to tamper with the client's unique identifier is substantially reduced.

Figure 1:
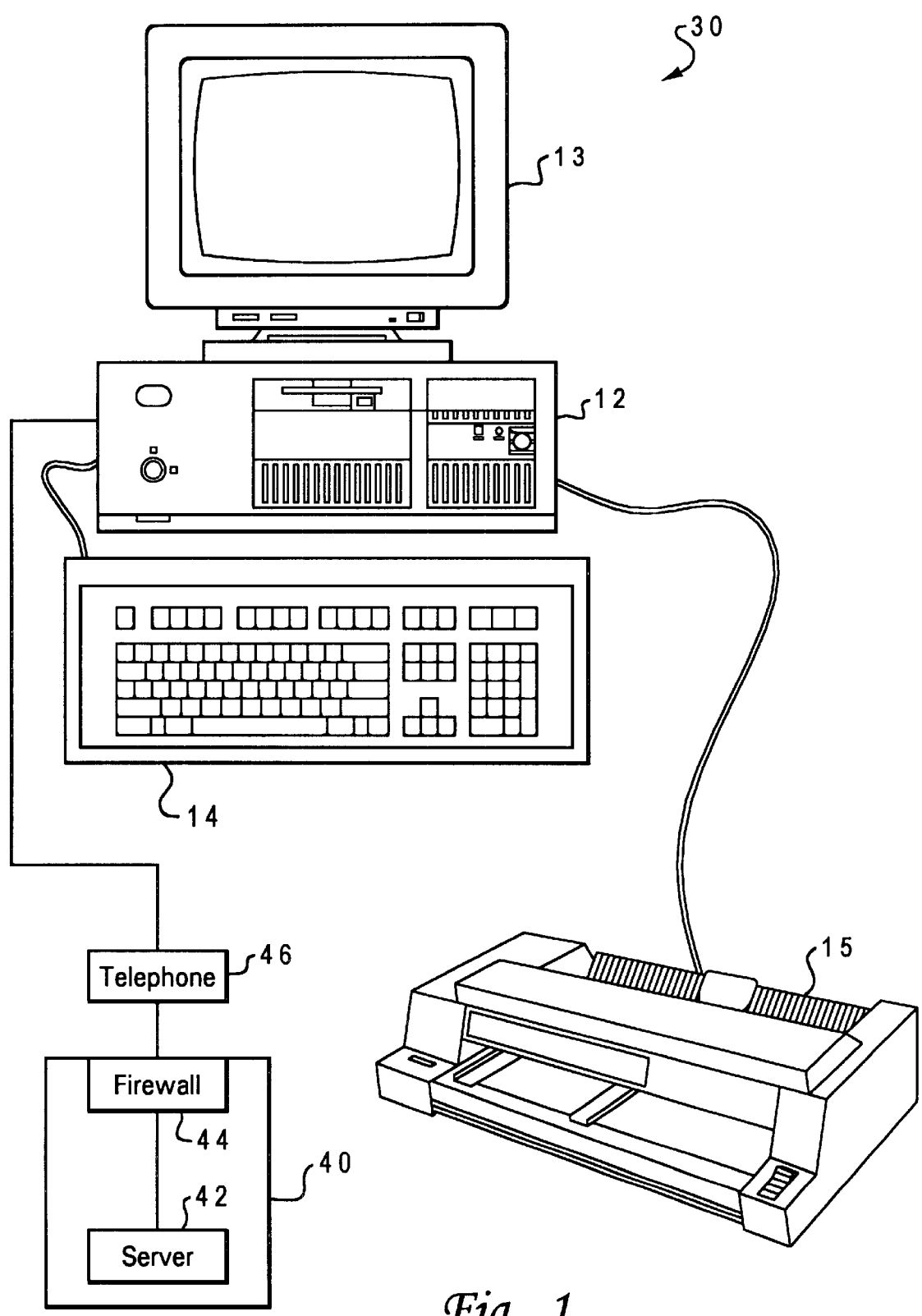
FIG. 1 illustrates a pictorial representation of a data processing system external to a secure network in accordance with the method and system of the present invention.

FIG. 1 illustrates a pictorial representation of a data processing system 30 external to a secure network 40 in accordance with the method and system of the present invention. Secure network 40 is controlled by server computer system 42, and is protected by firewall 44. Computer system 30 may establish a communication link with network 40 utilizing telephone 46.

Computer system 30 includes a computer 12, a monitor 13, a keyboard 14, and a printer or plotter 15. Computer system 30 may be implemented utilizing any commercially available computer system which has been suitably programmed and which has been modified as described below.

Figure 2:
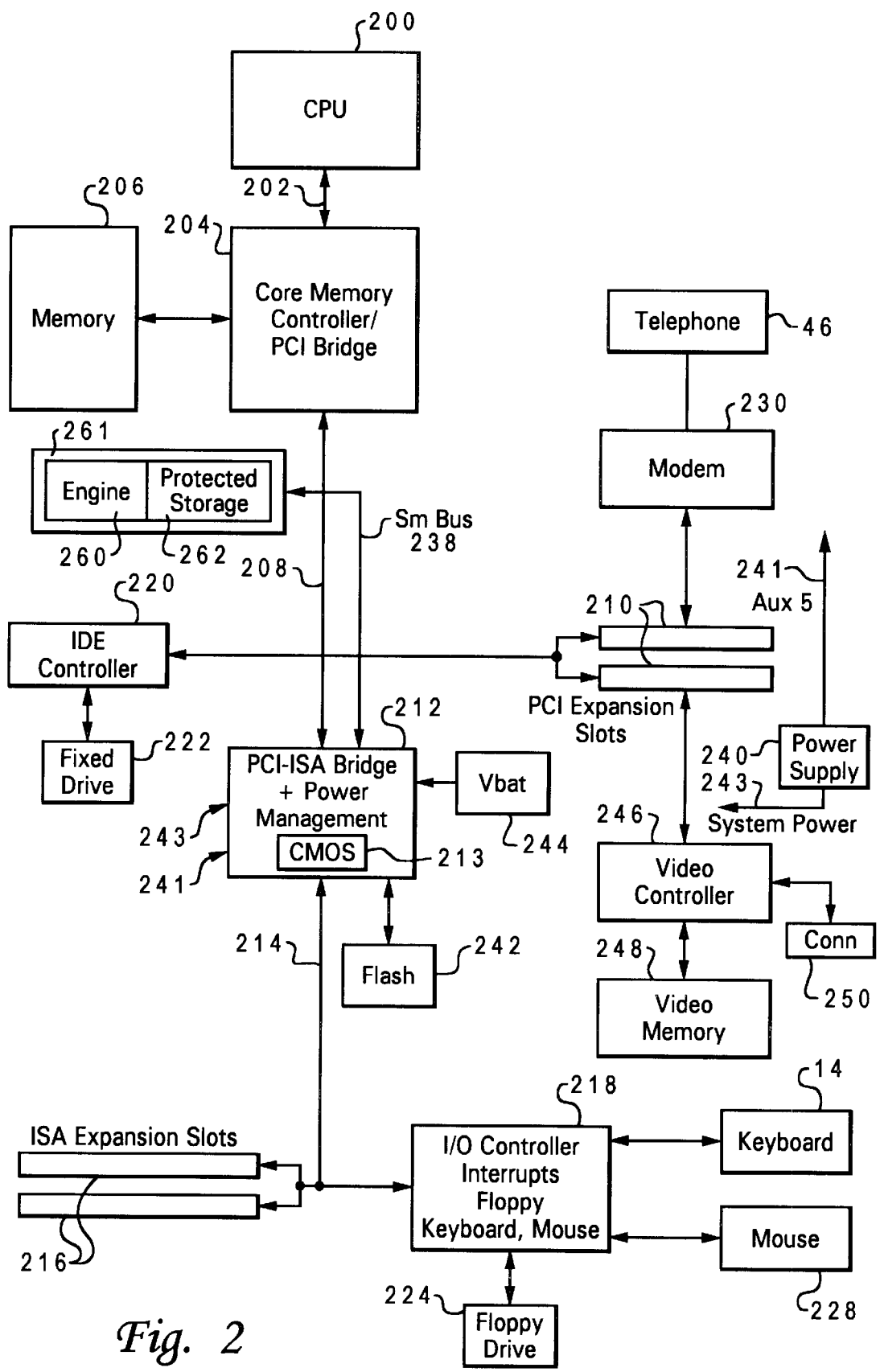
FIG. 2 depicts a more detailed pictorial representation of client computer system 30 in accordance with the method and system of the present invention.

FIG. 2 depicts a more detailed pictorial representation of computer system 30 in accordance with the method and system of the present invention. Computer system 30 includes a planar (also commonly called a motherboard or system board) which is mounted within computer system 30 and provides a means for mounting and electrically interconnecting various components of computer system 30 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 204 are connected to PCI bus bridge 204 utilizing PCI bus 208. IDE controller 220 provides for the attachment of IDE compatible storage devices, such a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 14, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system.

Computer system 30 includes a video controller 246 which may, for example, be plugged into one of PCI expansion slots 210. Video controller 246 is connected to video memory 248. The image in video memory 248 is read by controller 246 and displayed on monitor 13 which is connected to computer system 30 through connector 250.

Computer system 30 also includes a modem 230 for coupling computer system 30 to a telephone system 46. Computer system 30 may utilize modem 230 and telephone system 46 to establish a communication link with network 40.

Computer system 30 includes a power supply 240 which supplies full normal system power 243, and has an auxiliary power main AUX 5 241 which supplies full time power to the power management logic 212.

In accordance with the present invention, the planar includes an encryption device 261 which includes an encryption/decryption engine 260 which includes an encryption/decryption algorithm which is utilized to encode and decode messages transmitted and received by the planar, and protected storage 262. Engine 260 can preferably perform public private key encryption. Engine 260 may access a protected storage device 262. Protected storage device 262 is accessible only through engine 260. Storage device 262 cannot be read or written by other planar devices. The client's unique identifier and its encryption key pair are stored within storage 262. Everything stored in storage 262 is protected by engine 260 and is not accessible to the planar or its components. Device 262 may be implemented utilizing an electronically erasable storage device, such as an EEPROM. Access may be gained to non-readable storage device 262 in order to initially store the client private key. However, after the client private key is stored, it cannot be read or written. The keys stored in EEPROM 262 may not be read by any component of the planar other than engine 260.

Encryption device 261, including engine 260 and EEPROM 262, is coupled to PCI-ISA bridge 212 utilizing a system management (SM) bus 238. System management bus 238 is a two-wire, low speed, serial bus used to interconnect management and monitoring devices. Those skilled in the art will recognize that encryption device 261 may be coupled to another bus within the planar.

Figure 3:
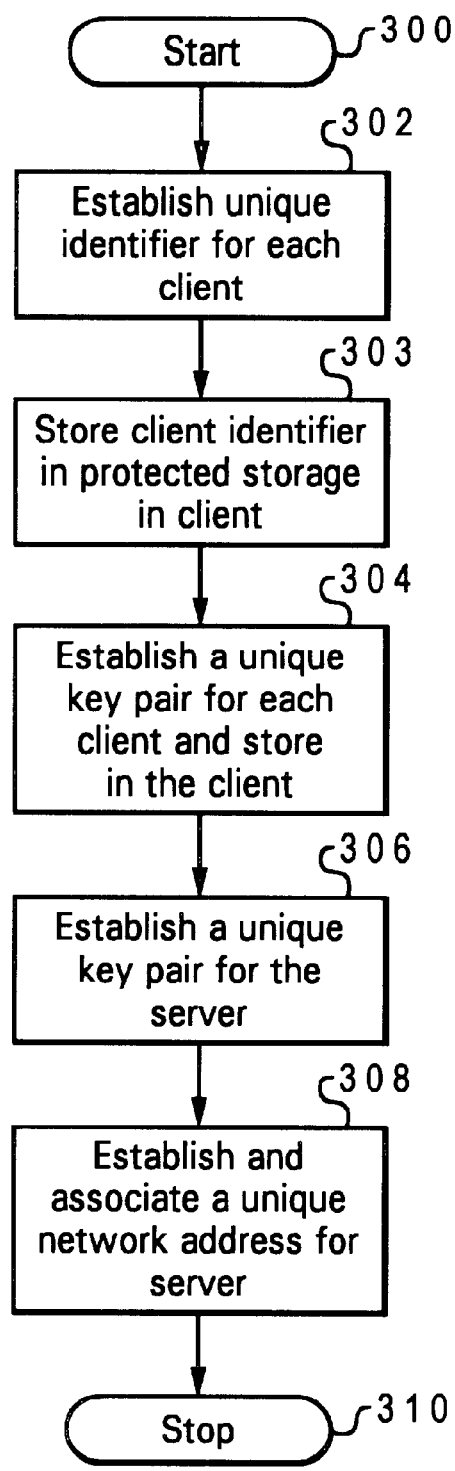
FIG. 3 illustrates a high level flow chart which depicts establishing a unique client identifier for each client and encryption keys in accordance with the method and system of the present invention.

FIG. 3 illustrates a high level flow chart which depicts establishing a client identifier for each client and encryption keys in accordance with the method and system of the present invention. The process starts as depicted at block 300 and thereafter passes to block 302 which illustrates establishing a unique identifier which uniquely identifies a particular client computer system. The process then passes to block 303 which depicts storing the unique client identifier in protected storage 262 in the client which is identified by the unique identifier. Next, block 304 depicts establishing a unique key pair, including a public and private key, for each client, and storing the client private key in storage 262. Thereafter, block 306 illustrates establishing a unique key pair for the server computer system. The process then passes to block 308 which depicts establishing and associating a unique network address for the server. The process then terminates as illustrated at block 310.

Figure 4:
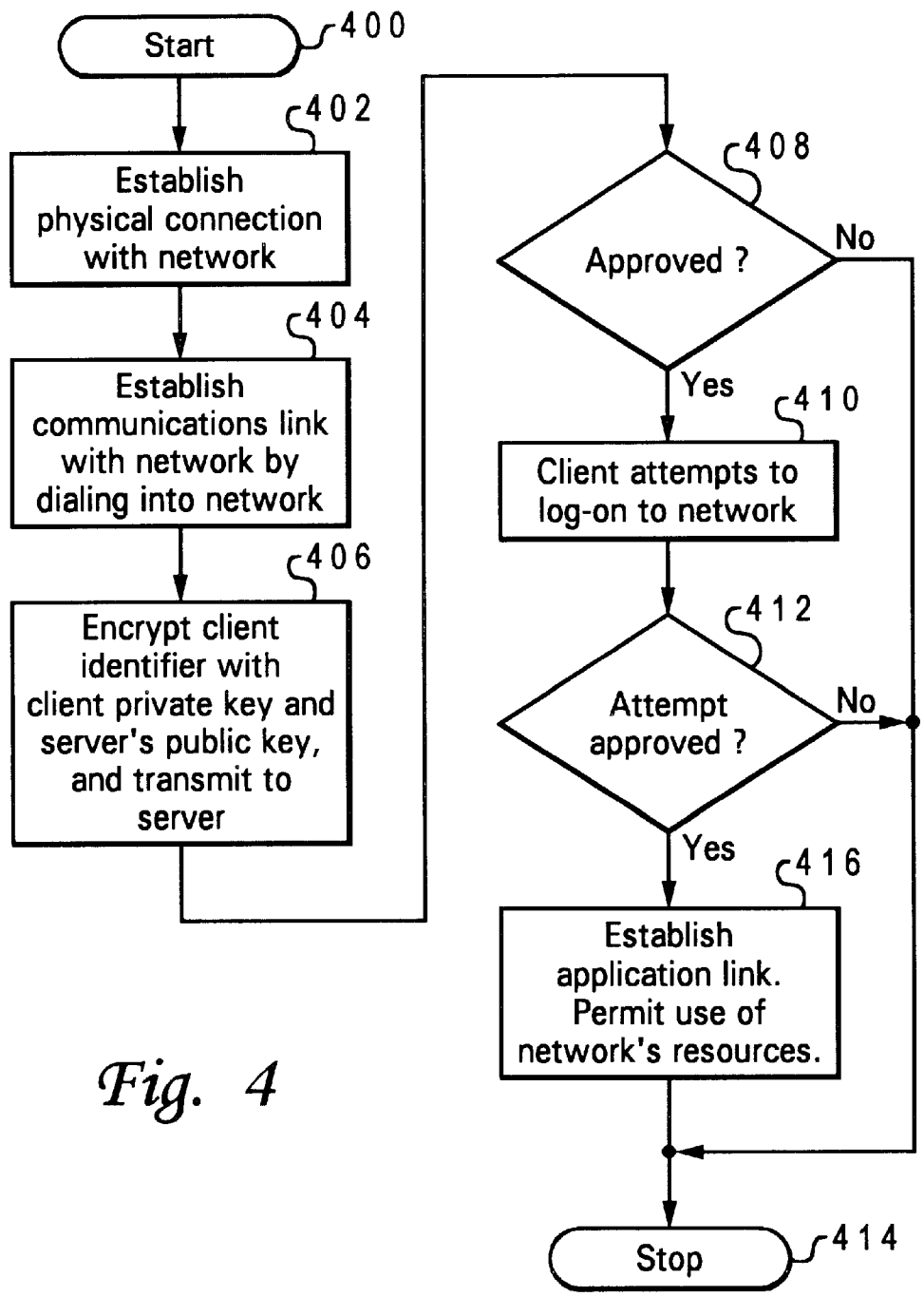
FIG. 4 depicts a high level flow chart which illustrates a client computer system transmitting its unique client identifier and awaiting approval to attempt to log-on to a secure network in accordance with the method and system of the present invention.

FIG. 4 depicts a high level flow chart which illustrates a client computer system transmitting its unique client identifier and awaiting approval to attempt to log-on to a secure network in accordance with the method and system of the present invention. The process starts as depicted at block 400 and thereafter passes to block 402 which illustrates establishing a physical connection with the network. Next, block 404 depicts establishing a communication link with the network by dialing into the network. The communication link permits limited communication between the client and the network. The communication link does not permit the client to have access to the network's resources. Access to the network's resources occurs when the client computer system is able to establish an applications link with the network.

The process passes to block 406 which depicts encryption device 261 encrypting the client identifier with the client private key thus creating a signature. A certificate which binds the client public and client identifier is appended to the signature. The combination of signature and certificate are then encrypted with the server public key. Thereafter, block 408 illustrates a determination of whether or not the client received an approval to attempt to log-on to the network to establish an application link. Server determines approval by decrypting the data with the server private key and then verifies the signature using the public key of the client from the certificate. If a determination is made that an approval was not received, the process terminates as depicted at block 414. Referring again to block 408, if a determination is made that an approval was received, the process passes to block 410 which depicts the client attempting to log-on to the network.

The process then passes to block 412 which illustrates a determination of whether or not the attempt to log-on to the network was successful. If a determination is made that the attempt was unsuccessful, the process terminates as depicted at block 414. Referring again to block 412, if a determination is made that the attempt was successful, the process passes to block 416 which illustrates establishing an application link with the network. When a client establishes an application link with the network, the client is permitted to utilize the network's resources.

Figure 5:
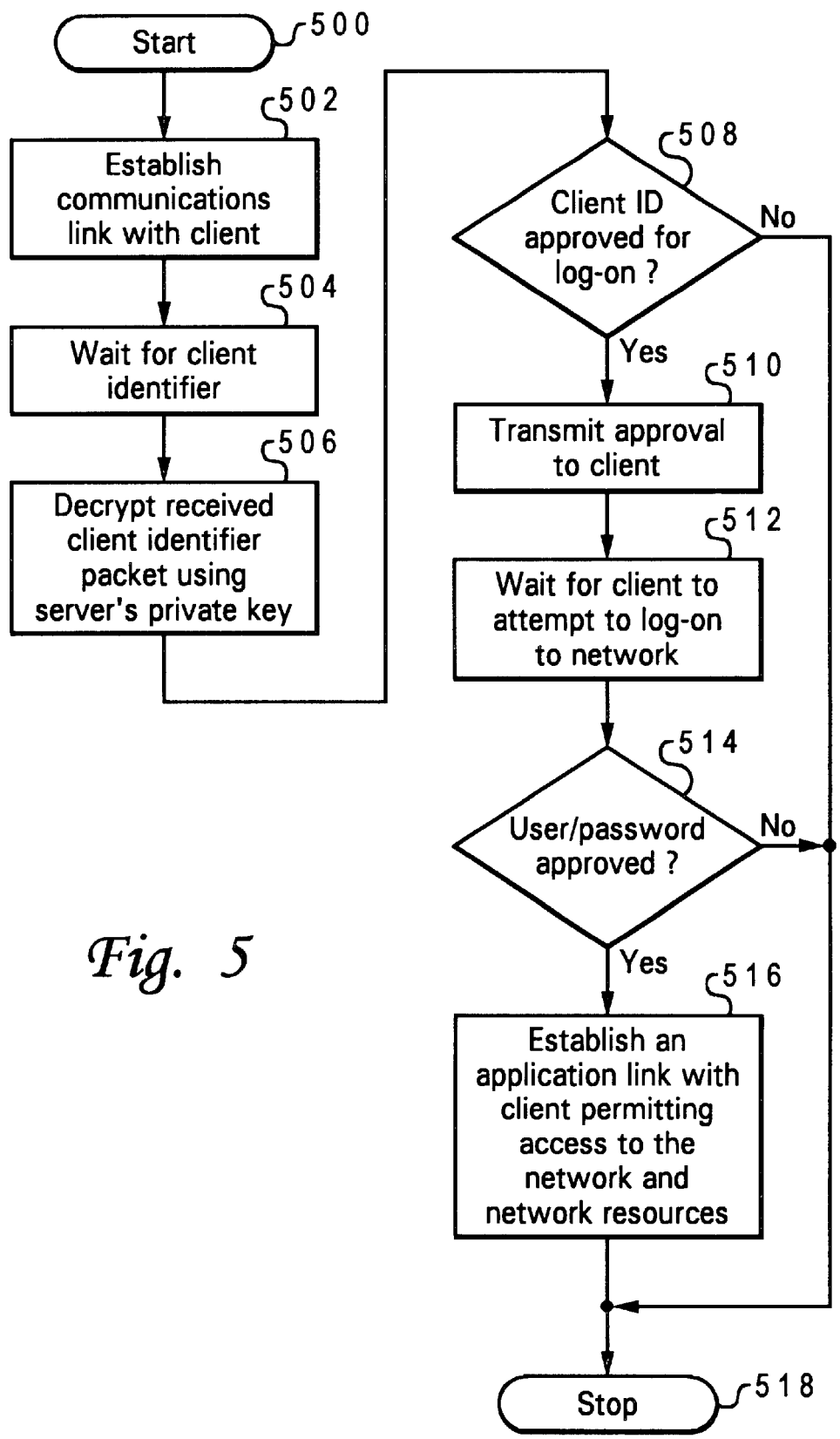
FIG. 5 illustrates a high level flow chart which depicts a server computer system determining whether to permit a particular client computer system identified by its unique identifier to attempt to log-on to its secure network in accordance with the method and system of the present invention.

FIG. 5 illustrates a high level flow chart which depicts a server computer system determining whether to permit a particular client computer system identified by its unique identifier to attempt to log-on to its secure network in accordance with the method and system of the present invention. The process starts as depicted at block 500 and thereafter passes to block 502 which illustrates the server computer system establishing a communication link with the client computer system. Next, block 504 depicts the server waiting for a client identifier. After the server has received an encrypted client identifier, block 506 illustrates the server decrypting the client identifier utilizing the server's private key and the client's public key obtained from the associated certificate.

The process then passes to block 508 which depicts the server determining whether or not the particular client identified by the decrypted client identifier is approved to attempt to log-on to the network. If a determination is made that the particular client identified by the received client identifier is not permitted to attempt to log-on to the network, the process terminates as illustrated at block 518. Referring again to block 508, if a determination is made that the particular client identified by the received client identifier is permitted to attempt to log-on to the network, the process passes to block 510 which depicts the server transmitting an approval to the client.

The process then passes to block 512 which illustrates the server waiting for the client to attempt to log-on to the network. After the server has received a user name and password from the client in an attempt by the client to log-on to the network, block 514 depicts a determination of whether or not the user name and password are approved for the particular client to log-on to the network. If the client is permitted to log-on to the network with the user name and password, the process passes to block 516 which illustrates the server establishing an application link with the client to permit the client to access the network and utilize the network's resources. The process then terminates as depicted at block 518. Referring again to block 514, if a determination is made that the user name and password combination are not approved to log-on to the network, the process terminates as illustrated at block 518.

While a preferred embodiment has been particularly shown and described, it will be understood by those skilled in the art that various changes in form and detail may be made therein without departing from the spirit and scope of the present invention.

What is claimed is:

1. A method in a data processing system for authenticating a client computer system to a secure network prior to permitting said client computer system to attempt to log-on to said secure network, said secure network being controlled by a server computer system, said method comprising the steps of:

establishing a unique identifier identifying said client computer system; and prior to permitting said client computer system to attempt to log-on to said secure network, said client computer system transmitting said unique identifier to said server computer system; and said server computer system utilizing said unique identifier to determine whether to permit said client computer system to attempt to log-on to said secure network, wherein said client computer system is authenticated prior to permitting said client computer system to attempt to log-on to said network.

2. The method according to claim 1, further comprising the steps of:

said network being secured by a firewall; and said client computer system establishing a communication link with said server computer system external to said firewall.

3. The method according to claim 2, further comprising the step of in response to said server computer system determining that said client computer system having said unique identifier may not attempt to log-on to said network, said server computer system prohibiting said client computer system from attempting to log-on to said network.

4. The method according to claim 3, further comprising the step of said client computer system transmitting said unique identifier in response to said client computer system establishing said communication link with said server computer system.

5. The method according to claim 4, further comprising the steps of:

establishing an encryption device within said client computer system; and said encryption device encrypting said client identifier prior to said client computer system transmitting said client identifier to said server computer system.

6. The method according to claim 5, further comprising the steps of:

in response to said server computer system determining that said client computer system having said unique identifier may attempt to log-on to said network, said server computer system permitting said client computer system to attempt to log-on to said network; and in response to said server computer system permitting said client computer system to attempt to log-on to said network, said client computer system attempting to log-on to said network by transmitting a user name and a password to said server computer system.

7. A data processing system for authenticating a client computer system to a secure network prior to permitting said client computer system to attempt to log-on to said secure network, said secure network being controlled by a server computer system, comprising:

said client computer system executing code for establishing a unique identifier identifying said client computer system; and prior to permitting said client computer system to attempt to log-on to said secure network, said client computer system executing code for transmitting said unique identifier to said server computer system; and said server computer system executing code for utilizing said unique identifier to determine whether to permit said client computer system to attempt to log-on to said secure network, wherein said client computer system is authenticated prior to permitting said client computer system to attempt to log-on to said network.

8. The system according to claim 7, further comprising:

a firewall within said network for securing said network; and said client computer system executing code for establishing a communication link with said server computer system external to said firewall.

9. The system according to claim 8, further comprising in response to said server computer system determining that said client computer system having said unique identifier may not attempt to log-on to said network, said server computer system executing code for prohibiting said client computer system from attempting to log-on to said network.

10. The system according to claim 9, further comprising said client computer system executing code for transmitting said unique identifier in response to said client computer system establishing said communication link with said server computer system.

11. The system according to claim 10, further comprising:

an encryption device included within said client computer system; and said encryption device executing code for encrypting said client identifier prior to said client computer system transmitting said client identifier to said server computer system.

12. The system according to claim 11, further comprising:

in response to said server computer system determining that said client computer system having said unique identifier may attempt to log-on to said network, said server computer system executing code for permitting said client computer system to attempt to log-on to said network; and in response to said server computer system permitting said client computer system to attempt to log-on to said network, said client computer system executing code for attempting to log-on to said network by transmitting a user name and a password to said server computer system.

13. A data processing system for authenticating a client computer system to a secure network prior to permitting said client computer system to attempt to log-on to said secure network, said secure network being controlled by a server computer system, comprising:

said client computer system executing code for establishing a unique identifier identifying said client computer system;

prior to permitting said client computer system to attempt to log-on to said secure network, said client computer system executing code for transmitting said unique identifier to said server computer system; and said server computer system executing code for utilizing said unique identifier to determine whether to permit said client computer system to attempt to log-on to said secure network, wherein said client computer system is authenticated prior to permitting said client computer system to attempt to log-on to said network;

a firewall within said network for securing said network;

said client computer system executing code for establishing a communication link with said server computer system external to said firewall;

in response to said server computer system determining that said client computer system having said unique identifier may not attempt to log-on to said network, said server computer system executing code for prohibiting said client computer system from attempting to log-on to said network;

said client computer system executing code for transmitting said unique identifier in response to said client computer system establishing said communication link with said server computer system;

an encryption device included within said client computer system;

said encryption device executing code for encrypting said client identifier prior to said client computer system transmitting said client identifier to said server computer system;

in response to said server computer system determining that said client computer system having said unique identifier may attempt to log-on to said network, said server computer system executing code for permitting said client computer system to attempt to log-on to said network; and in response to said server computer system permitting said client computer system to attempt to log-on to said network, said client computer system executing code for attempting to log-on to said network by transmitting a user name and a password to said server computer system.

* * * * *